Dec. 25, 1923.
1,478,688
A. C. WHIDDEN
MULTIPLE SUPPLY VALVE
Filed Aug. 7, 1922
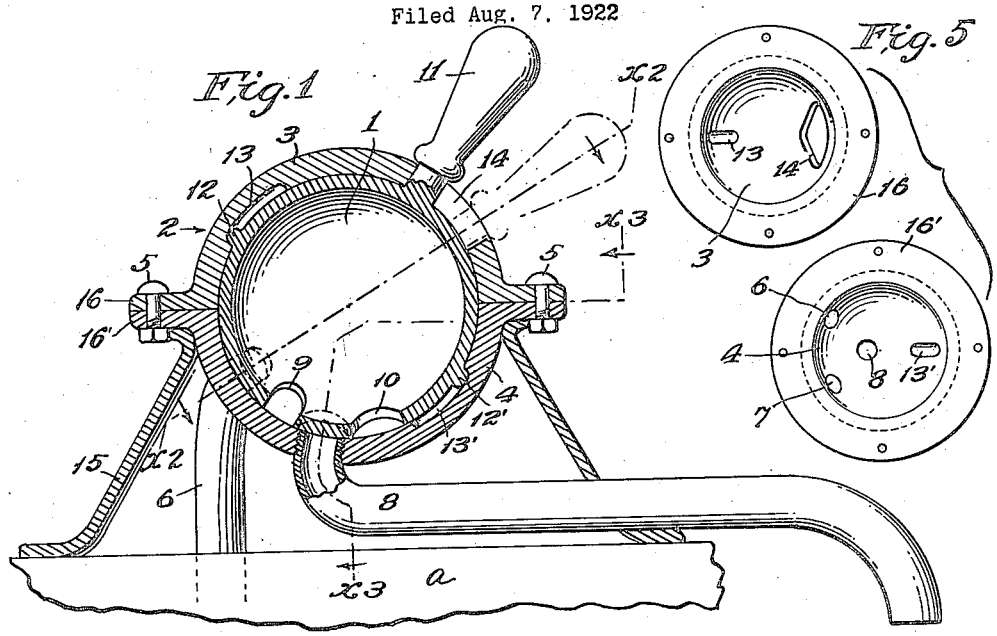
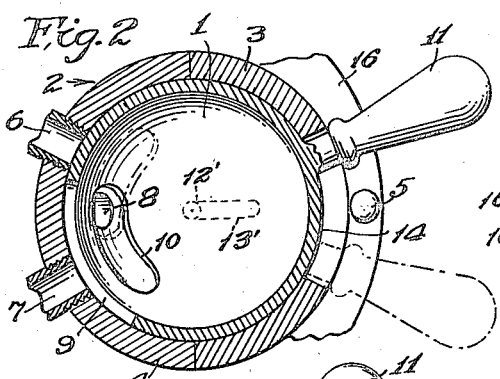
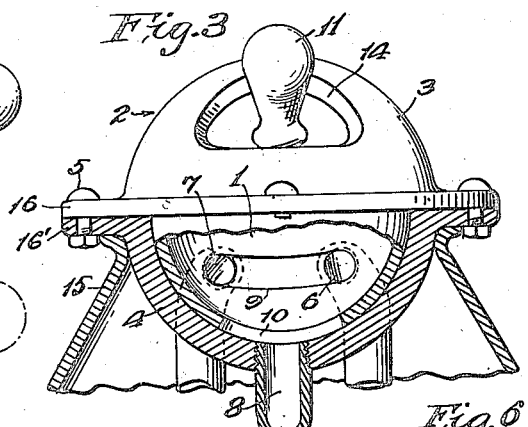
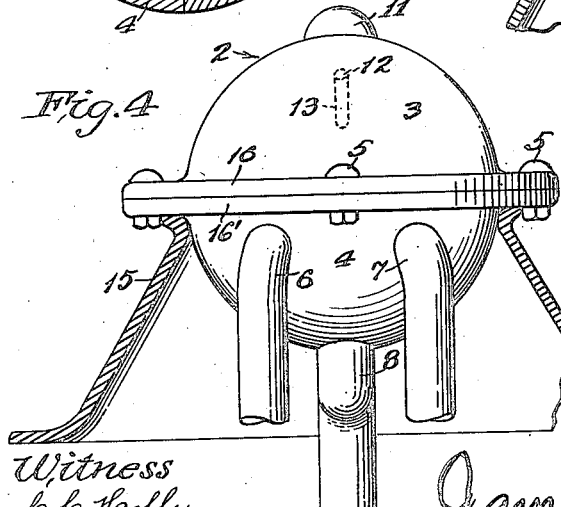
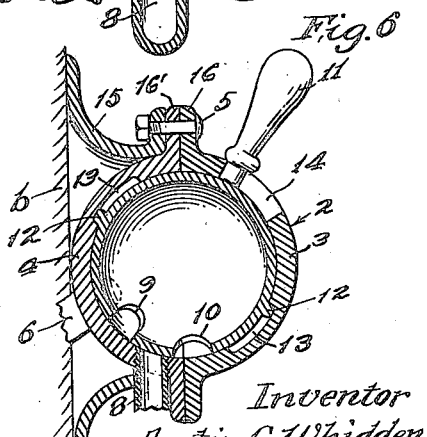
Witness
C. C. Holly
Inventor
Austin C. Whidden
by James R. Townsend
his atty.

Patented Dec. 25, 1923.

1,478,688

UNITED STATES PATENT OFFICE.

AUSTIN C. WHIDDEN, OF LOS ANGELES, CALIFORNIA.

MULTIPLE SUPPLY VALVE.

Application filed August 7, 1922. Serial No. 580,131.

*To all whom it may concern:*

Be it known that I, AUSTIN C. WHIDDEN, a citizen of the United States, residing at Los Angeles, in the county of Los Angeles and State of California, have invented a new and useful Multiple Supply Valve, of which the following is a specification.

This invention is applicable for bathroom, kitchen, laundry, and other uses where it may be desirable to alternatively supply cold, hot and warm water of various temperatures produced by mixing the hot and cold water in various proportions; and an object is to produce a simple and unique valve that will perform this office in a convenient manner with perfect precision.

This invention broadly includes a multiplex valve controlled by a single handle, to deliver either hot or cold water or any desired mixture thereof; and is broadly new, basic and pioneer, in that it comprises in one fixture a mounting and a globular chamber oscillatable therein and provided with ports and with a handle and cooperating with the mounting to control the ports to regulate the flow of hot and cold water to produce a mixture thereof having a predetermined temperature and to also control the discharge of the same from said mixing chamber, and an object is to obtain this result in the simplest possible manner and with but slight movement of the handle.

Another object is compactness, neatness and attractiveness of appearance.

Another object is to so construct a fixture having the above features that it will present a smooth exterior, which may be easily cleaned or brightened.

The invention is applicable for mixing any two liquids that are readily mixible with each other.

Other objects, advantages and features of invention may appear from the accompanying drawing, the subjoined detail description and the appended claims.

The invention may be carried out in various forms.

The accompanying drawing illustrates the invention in a form at present deemed most desirable.

Figure 1 is a sectional view of the valve mounted on a wash bowl, a fragment of which is shown, the valve being closed. Dot and dash lines indicate full open position.

Fig. 2 is a broken view in section on line $x^2$, Fig. 1, with outlet and cold water intake open and hot water intake closed. Dot and dash lines indicate a position with outlet and hot water intake open and the cold water intake closed.

Fig. 3 is a broken view in section on irregular line $x^3$—$x^3$, Fig. 1, with both hot and cold inlets open.

Fig. 4 is a broken view from the left of Fig. 1, showing the base in section.

Fig. 5 is an inside view in reduced scale of the two outer complementary shells detached.

Fig. 6 is a sectional view of another form of the valve on a vertical wall of a bath tub or laundry tub.

The mixing chamber 1 is in the form of a hollow sphere, and is oscillatable in a globular shell 2, comprising two semi-spherical sides 3, 4 clamped together by any suitable means as screws or bolts 5 to form a housing and a seat for the mixing chamber 1. The side 4 of the shell 2 is provided with hot and cold water inlets 6, 7, respectively, and a discharge outlet 8.

The mixing chamber 1 is provided with an elongate opening in the form of a slot 9, of sufficient length to simultaneously register with both inlets 6, 7, and is provided with an opening or port 10 of sufficient size to register with the outlet 8 whenever the mixing chamber is positioned to admit liquid from either one or both of the inlets 6, 7. A handle 11 secured to the mixing chamber serves as means for operating said chamber to partially or fully open or close either or both of the inlets and the outlet, as desired.

The globe 1 is provided on diametrically opposite sides with lugs 12, 12′ oscillatable in grooves 13, 13′ and which serve as an axis or pivot on which the chamber may be oscillated by means of the handle 11; said grooves 13, 13′ are provided in the inner walls of the sides 3, 4, respectively. Said grooves 13, 13′ are elongated to accommodate the pivot points or lugs 12, 12′ as the chamber is oscillated to bring the outlet 10 into register with the outlet 8 of the shell, and to bring the opening 9 into register with the inlets 6, 7, as shown in dotted lines in Fig. 1 and in full lines in Fig. 3, such position admitting both hot and cold water through the inlets 6 and 7 and mixing the same in the chamber 1, whereby warm water will be discharged through the outlet through 10 and 8.

Should either cold or hot water be desired independently of the other, the handle 11 is turned to swing the spherical mixing chamber upon its axis or pivots 12, 12' to either the right or left, to completely or partially close either the cold or hot water inlet, as desired, with or without partially closing the discharge outlet 8. The opening 14 in the semi-spherical part 3 of the shell 1 is of sufficient size for such movement.

I thus provide a valve by which water having predetermined degrees of temperature may be produced in the mixing chamber in regulated quantities and delivered therefrom in regulated quantities upon proper adjustment of the handle 11.

The valve is supported by a base 15 secured to a wash-stand or other suitable support $a$, and upon which the flanges 16, 16' of the shell 2 rest.

The modified form, shown in Fig. 6, is adapted to be applied to the vertical wall $b$ of a bath tub or laundry tub.

The spherical chamber and the shell may be constructed in any manner known to the art for preventing leakage, and in the form shown the spherical chamber and the shell are joined by a ground joint.

It is understood that although it is important that the exterior of the oscillatable chamber and the interior of the shell shall be of spherical construction so as to form, as it were, a ball and socket joint that the interior of the chamber and the exterior of the shell may be of any practicable shape or form adapted to the principle therein set forth, and I do not limit myself to the specific construction shown for the outer and inner elements 1, 2, 3.

I claim.

1. A valve comprising a spherical mixing chamber, a shell surrounding said chamber, means for revolving the mixing chamber on an axis within said shell, and means for changing the direction of said axis.

2. In a valve, a spherical mixing chamber; a housing for said mixing chamber; said housing being composed of semi-spherical complementary members; a plurality of inlets and an outlet in one of said housing members; an inlet and an outlet in said mixing chamber; axial pivots on said mixing chamber, there being a groove in each of said housing members in which the pivots are accommodated, means for oscillating the mixing chamber on said pivots and for shifting the pivots in the grooves for the purpose of registering the inlet and outlet of said chamber with the inlets and outlet of the housing, respectively.

3. In a valve, a shell having inlets and an outlet, there being elongate grooves in said shell; a chamber seated in said shell and having pivot means extending into said grooves, said chamber having an inlet and an outlet adapted to register with the inlets and outlet of said shell; and a handle for moving said chamber to bring said inlets and outlets into and out of register with each other.

4. In a valve, a shell having two inlets and an outlet and being provided with elongate grooves; a chamber having elongate inlet and outlet openings adapted to be moved into and out of register with the inlets and outlet of the shell, respectively; pivots on said chamber and accommodated in said grooves; and a handle adapted to move said pivots longitudinally in said grooves to bring the inlet and outlet openings of said chamber into and out of register with each other, and for rotating said chamber on said pivots to open and close one of said two inlets of said shell and to keep the outlet opening of said chamber in register with the outlet of said shell.

In testimony whereof, I have hereunto set my hand at Los Angeles, California, this 28th day of July, 1922.

AUSTIN C. WHIDDEN.

Witness:
JAMES R. TOWNSEND.